United States Patent [19]
Van Stratum

[11] Patent Number: 6,074,720
[45] Date of Patent: Jun. 13, 2000

[54] GAME TABLE FABRIC AND METHOD OF APPLYING SAME

[75] Inventor: Peter Van Stratum, Burlington, Conn.

[73] Assignee: Chas. W. House & Sons, Inc., Unionville, Conn.

[21] Appl. No.: 09/078,070

[22] Filed: May 13, 1998

[51] Int. Cl.[7] .............................. A47C 17/62; B32B 7/06
[52] U.S. Cl. ................ 428/41.4; 428/41.8; 428/355 RA; 442/151; 442/152; 473/29; 473/30
[58] Field of Search .................................. 428/41.4, 41.8, 428/355 RA; 442/151, 152, 149; 473/29, 30

[56] References Cited

U.S. PATENT DOCUMENTS

| | | |
|---|---|---|
| 1,143,222 | 6/1915 | Nathan . |
| 1,369,992 | 3/1921 | Turner . |
| 1,524,758 | 2/1925 | Stedman et al. . |
| 2,092,521 | 9/1937 | Norris . |
| 2,142,039 | 12/1938 | Abrams et al. ............................ 106/23 |
| 3,323,797 | 6/1967 | Horton, Jr. . |
| 3,489,410 | 1/1970 | Stillman, Jr. et al. . |
| 3,658,328 | 4/1972 | Kooker . |
| 3,837,298 | 9/1974 | Leonhart . |
| 3,897,290 | 7/1975 | Haller . |
| 3,983,298 | 9/1976 | Hahn et al. .............................. 428/355 |
| 4,120,494 | 10/1978 | Roe . |
| 4,229,004 | 10/1980 | Stokes . |
| 4,380,563 | 4/1983 | Ayotte . |
| 4,849,267 | 7/1989 | Ward et al. . |
| 4,989,863 | 2/1991 | Hall . |
| 5,183,254 | 2/1993 | Jones . |
| 5,296,277 | 3/1994 | Wilson et al. ............................ 428/40 |
| 5,449,539 | 9/1995 | Stepanek . |
| 5,487,929 | 1/1996 | Rusincovitch, Jr. et al. . |
| 5,639,539 | 6/1997 | DeProspero et al. . |

OTHER PUBLICATIONS

Mike Shaw, "*A step-by-step approach to recovering your pool table*", Oct. 1979, pp. 30–32.

*Primary Examiner*—Blaine Copenheaver
*Attorney, Agent, or Firm*—Cantor Colburn LLP

[57] ABSTRACT

A game table fabric to be applied to the game table bed of a game table is provided, wherein the game table fabric comprises a woolen fabric having a nonpermanent releasable adhesive applied to a back side of the woolen fabric so that the game table fabric may be directly applied to the game table bed and the game table fabric of the present invention is readily repositionable during installation and removable after an extended period of use. The nonpermanent releasable adhesive is formed of a low tack polymeric material which is suitable for releasably adhering the game table fabric to the game table bed. By applying the game table fabric of the present invention directly to the game table bed, the use of additional glues or adhesives to adhere the game table fabric to the game table bed is essentially eliminated. Such glues and adhesives constitute contaminants to the game table bed and contribute to increase wear of the game table fabric and reduce the rapid and true carry of the ball on the playing surface of the game table fabric. The playing surface of the game table fabric of the present invention provides an attractive and functional playing surface for the rapid and true (non-veering) carry (roll) of the ball during play on a game table. In another embodiment, the game table fabric of the present invention provides an attractive and functional surface for card and dice game tables, such as those typically found in casinos.

4 Claims, 3 Drawing Sheets

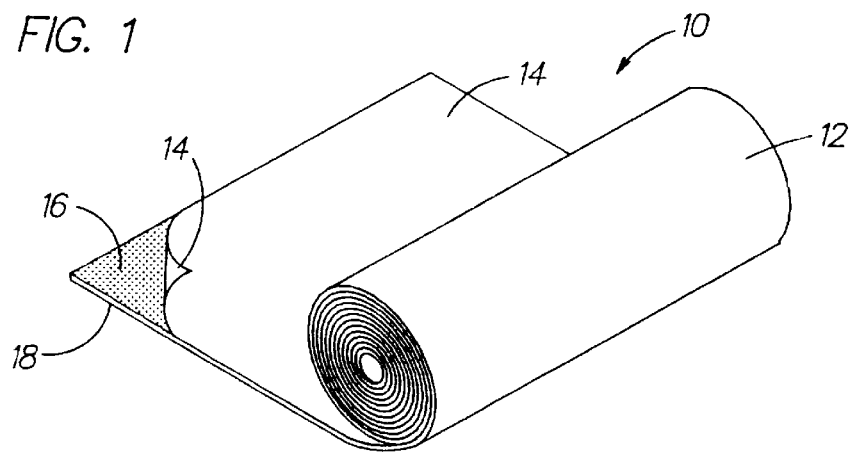
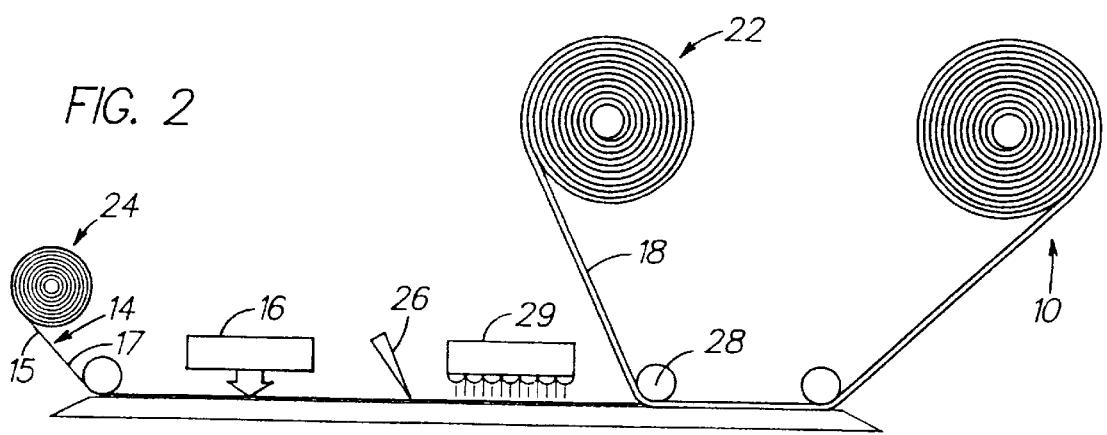

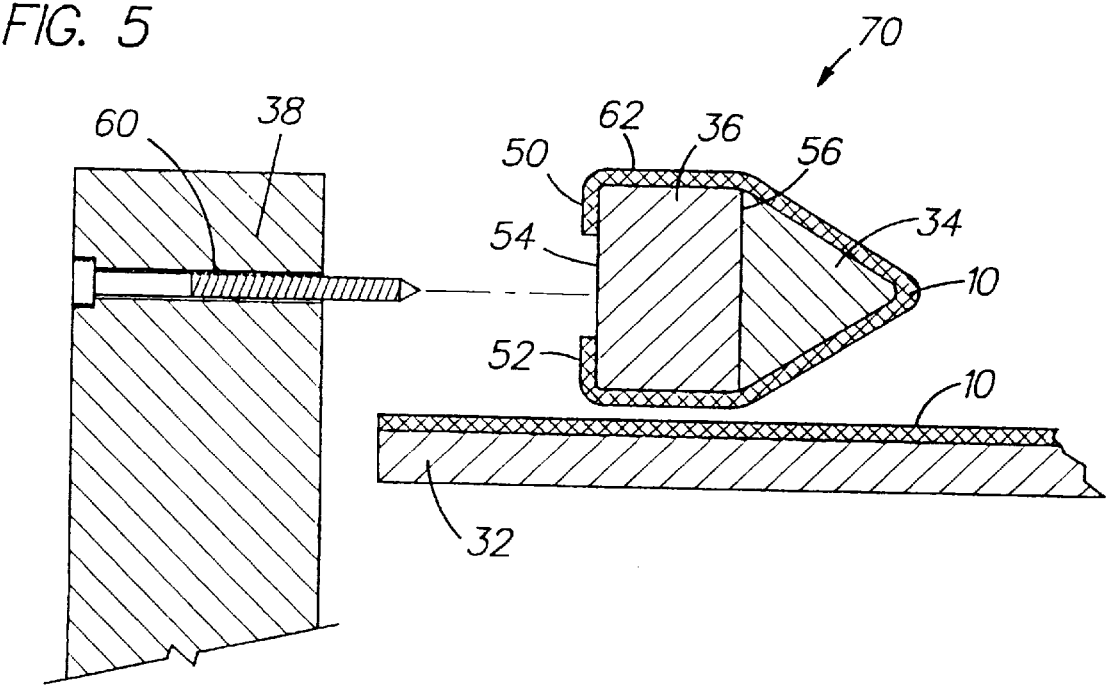
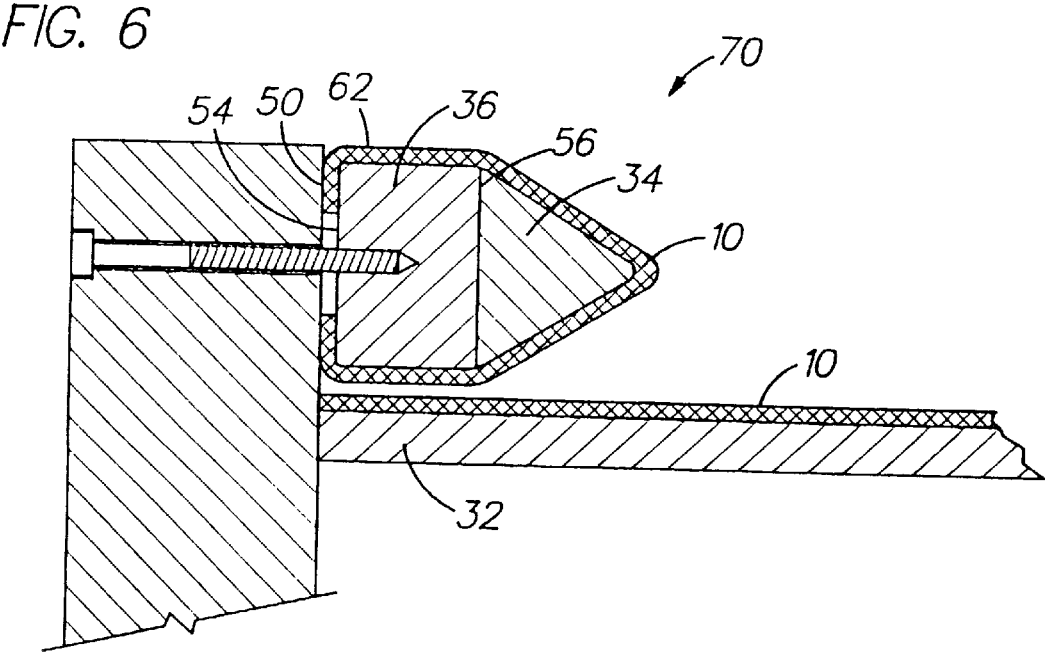

GAME TABLE FABRIC AND METHOD OF APPLYING SAME

BACKGROUND OF THE INVENTION

1. Field of the Invention

This invention relates generally to the game table fabrics of games tables, particularly tables for playing ball games such as Snooker, Billiards, and Pool and to the method of surfacing the game table bed of same. More particularly, this invention relates to a novel game table fabric having a front side and a back side wherein the front side of the game table fabric comprises a playing surface and the back side has a nonpermanent releasable adhesive disposed thereon whereby the nonpermanent releasable adhesive allows the game table fabric to be securely held to a game table bed yet the game table fabric may be cleanly removed from the game table bed if repositioning of the game table fabric is needed or if replacement of a section or all of the game table fabric is required.

2. Brief Discussion of the Prior Art

Such ball games, or games essentially similar to them, have been played for a considerable amount of time throughout the world, and the same type of table is used for each variant of the game, e.g. Snooker, Billiards, Pool, Russian Billiards, American Pool, etc. Traditionally, the tables used for these games have a hard wooden frame supporting a bed of flat material, such as slate, upon which a felt cloth playing surface is provided. While felt cloth is a preferred material, it is known in the arts and it is within the scope of this invention that other similar fabrics may be used as the playing surface of the game table.

For many decades, "woven felts" of wool fabric have been the substrate of choice for the playing surface of game tables. The dyed and sometimes decorated fabrics provide an attractive and functional surface for the rapid and true (non-veering) "carry" (roll) of the ball. In the high performance end of the game table market, the woolen (or wool fiber blend) fabric is secured to the slate top of the game table. To facilitate this operation, a second fabric is attached to the back-side of the woolen fabric. The second fabric preferably comprises a polyester/cotton or polyester/rayon blend and this second fabric is commonly referred to as a "backing fabric". Both the backing fabric and the woolen fabric are then attached to the wooden frame supporting the slate top by a combination of mechanical means such as staples or tacks. In addition, spot application of the contact glue directly to the slate is frequently required to tighten "loose" sections of the covering and to make the overall tautness of the covering more uniform.

This procedure requires many hours by a trained, experienced technician and the quality of the resulting installation depends to a large degree on the skill of the installer. The quality of the installation may be measured in terms of the flatness, smoothness, uniformity in tension, freedom of wrinkles, and "speed" of the table. Thus, this operation is generally beyond the skills of the average homeowner.

In state-of-the-art two-fabric composite system, the backing cloth may be already fabricated into the woolen felt as supplied or it may be attached to the woolen underside at a later point but always prior to the actual table installation. In addition to adding cost, the underlying backing material allows poorer conformity of the overall "composite" covering to the flatness of the slate, which in turn, adversely affects the speed of the rolling ball. A "fast" table, wherein the woolen fabric offers a hard smooth planar surface is a very desirable objective for a quality billiard table installation or recovering of the playing surface.

In addition to the extra material cost and installation time required by using the two-fabric system, other disadvantages occur during the use of a game table having a two-fabric system playing surface. For example, "mis-cued shots" in which the tip of the player's pool stick inadvertently strikes the playing surface can cause shifting and "gathering" of the woolen surface since some slight movement between the two-fabric planes occurs. In turn, this gathering in front of the cue stick may cause tearing of the woolen surface.

Moreover, the process to recover game tables having a two-fabric system playing surface introduces a particularly deleterious factor. After the original worn two-fabric layer system is removed for replacement, the supporting slate bed must then be thoroughly cleaned with aggressive solvent to remove all traces of glue. An unavoidable consequence during these cumbersome handling procedures is the transfer of "chalk dust". Chalk dust is commonly used by players to improve the non-slip contact of the pointer of the pool sticks and the billiard balls, however, the chalk dust contaminates the table covering. Furthermore, throughout the cumbersome recovering process for replacing or repairing the playing surface the chalk dust can easily transfer to the slate bed and become particularly difficult to remove in areas where spot gluing was required. Any small grains of residual dust then act as abrasion sites against the backside of the replacement game table playing surface and substantially accelerates the wear of the woolen fabric playing surface. Thus, professional game tables or any game tables with heavy usage frequently require recovering after only a few months time due to the wear and damage factors described hereinbefore. In time, this type of expansive, two-fabric recovering may even adversely affect the planarity of the surface of the slate bed itself due to the frequent spot gluing, spot adhesive removal, dust contamination, etc.

It has been and remains a consistent goal of the game t able clot h industry to keep handling and thereby dust transfer to a minimum. Consequently, there is a need for reducing the complexity and the difficulty associated with the installation and recovering of a woolen fabric playing surface. Also, such needs require that the significant contaminants which arise of from th e recovering process be eliminated or alleviated thereby extending the wearing of the playing surface. The present invention is directed to a novel game table fabric and method of manufacture thereof and method of installation or recovering of the game table fabric.

SUMMARY OF THE INVENTION

The above-described and other problems and deficiencies of the prior art are overcome or alleviated by the game table fabric of the present invention, wherein the game table fabric comprises a woolen fabric having a front side and a back side, the front side comprises the playing surface and the back side has a nonpermanent releasable adhesive disposed thereon so that the game table fabric may be directly applied to a game table bed. The game table fabric of the present invention is readily repositionable during installation and removable after an extended period of use. The nonpermanent releasable adhesive is formed of a low tack polymeric material which is suitable for releasably adhering the game table fabric to the game table bed. By applying the game table fabric of the present invention directly to the game table bed, the use of additional glues or adhesives to adhere the game table fabric to the game table bed is essentially eliminated.

The present invention also provides a method for manufacturing the game table fabric. The method includes providing a game table fabric and disposing a nonpermanent releasable adhesive to the back side of the game table fabric to form a nonpermanent releasable adhesive layer. Preferably, the formation of the nonpermanent releasable adhesive layer is carried out by coating the back side of the game table fabric with the nonpermanent releasable adhesive. The nonpermanent releasable adhesive is then subjected to conditions sufficient to dry the nonpermanent releasable adhesive and to cure the polymeric material of the adhesive. A release cover is then provided and applied to the nonpermanent releasable adhesive layer on the back side of the game table fabric. The game table fabric may then be rolled for convenient storage until the installation or resurfacing of the game table fabric.

In accordance with the present invention, a method of installing or recovering the game table fabric is provided. The installation or recovering of the game table fabric now becomes a much simpler and quicker task to complete when using the game table fabric of the present invention. The protective release cover is easily removed from the nonpermanent releasable adhesive layer disposed on the game table fabric and the installer positions the nonpermanent releasable adhesive layer of the woolen fabric directly to the game table bed. The entire game table fabric can now quickly be positioned, tightened or smoothed out over the entire game table bed before any mechanical attachment is even necessary. In accordance with the present invention, no backing fabric for the underside of the game table fabric is required prior to application of the game table fabric to the game table bed. Consequently, the handling and application process is greatly simplified and the time needed to complete said tasks is significantly reduced.

While the adhesive grip is more than adequate to hold the adhesive coated game table fabric in place, the game table fabric may nevertheless be cleanly removed if so desired or necessary for repositioning during the installation process or when the game table fabric eventually needs to be completely recovered. When the adhesive coated game table fabric is pulled away with sufficient force to separate it from the game table bed, the adhesive bond breaks and releases cleanly while adhering only to the back side of the game table fabric. The game table bed is left clean with no residue and the opportunity for chalk dust to contaminate the game table bed is substantially eliminated. As a result, extended wear of the game table fabric is realized due to the above-described advantages of the present invention.

When the game table fabric of the present invention is used in the resurfacing of a game table, the old existing game table fabric needs to be removed. In order to recover a game table, the rails of the table are typically removed so that access to the entire area of the game table bed may be had. The old fabric is removed and the game table bed is prepared for its new game table fabric by adequately cleaning the slate. The game table bed may be cleaned by washing it with a soap and water solution. Any nicks or gashes in the game table bed should be filled with a suitable material to insure the surface of the game table bed to be completely smooth. Any old glue or adhesive material where previous fabric was held down should be sprayed with a solvent and removed. The clean game table bed (slate surface preferably) is now ready to be recovered. The installer simply spreads the game table fabric of the present invention over the entire surface of the game table bed and cuts the material to the specific dimension of the game table bed. The installer then peels back about a foot to about eighteen (18) inches of the release cover thereby exposing the nonpermanent releasable adhesive of this exposed area. The installer then applies the nonpermanent releasable adhesive surface of the game table fabric to the game table bed and then pulls the release cover from the adhesive surface the entire length of the game table bed thereby attaching the nonpermanent releasable adhesive surface to the game table bed. After smoothing the game table fabric out over the entire game table bed, the game table fabric is trimmed along the entire edge of the game table bed by conventional cutting means. The installer uses a small amount of contact glue at the pockets of the table to assure contouring of the game table fabric at the pocket openings. The installation of the game table fabric on a game table using the game table fabric of the present invention is accomplished in ⅓ (33%) less time in relation to the traditional installation time using traditional fabrics. The installer, if necessary, can reposition the material up to six (6) times before there is any reduction in the original tack of the nonpermanent releasable adhesive used in accordance with the present invention. One advantage of the present invention is that a backing fabric is not used along with the game table fabric as in two-fabric playing surfaces. The previously discussed disadvantages associated with using such a backing fabric are thus eliminated by the game table fabric of the present invention.

BRIEF DESCRIPTION OF THE DRAWINGS

For the purpose of illustrating the invention, the following drawings are presented; it being understood, however that this invention is not limited to the precise arrangements and instrumentalities shown. Referring now to the drawings wherein like elements are numbered alike in the several FIGURES:

FIG. 1 is a perspective view of a wound roll of game table fabric in accordance with the present invention;

FIG. 2 is a diagrammatic view of an alternate embodiment showing one stage in the manufacture of the game table fabric where the nonpermanent releasable adhesive and protective release covering are disposed onto a woolen fabric;

FIG. 5 is an exploded side elevational sectional view depicting a game table having the game table fabric of the present invention releasably adhered on the game table bed and table cushion; and FIG. 6 is a side elevational sectional view depicting a game table having the game table fabric of the present invention releasably adhered on the game table bed and table cushion.

DETAILED DESCRIPTION OF THE INVENTION

Figure 3:
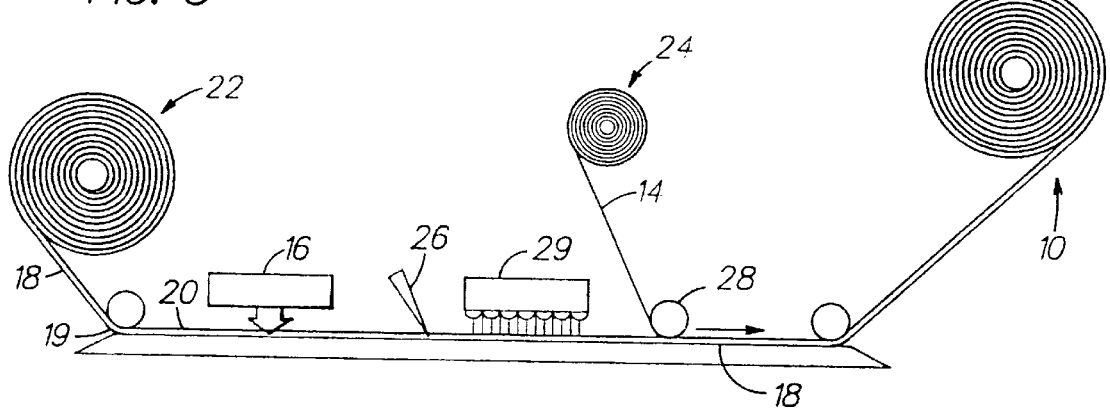
FIG. 3 is a diagrammatic view of one stage in the manufacture of the game table fabric where the nonpermanent releasable adhesive and protective release covering are disposed onto a woolen fabric.

Turning to FIGS. 1–4, the present invention is directed towards an improved game table fabric 10 to be releasably adhered to a game table bed 32 and a method of manufacture thereof. In addition, in accordance with the present invention, an improved method of installing and recovering the game table fabric 10 is provided.

Advantageously, the game table fabric 10 of the present invention comprises a nonpermanent releasable adhesive system instead of the conventional two-fabric systems of the prior art. The game table fabric 10 comprises a fabric 18 having a front side 19 and a back side 20, wherein a nonpermanent releasable adhesive 16 is applied to the back side 20 of the fabric 18 allowing the game table fabric 10 to be readily repositionable during installation of the game table fabric 10 and removable after an extended period of use. The nonpermanent releasable adhesive 16 is formed of a low tack polymeric material which is suitable for releasably adhering the game table fabric 10 to the game table bed 32. Conventionally for playing ball game tables the game table bed 32 comprises a slate bed suitable for providing a smooth surface for supporting the game table fabric 10. The game table fabric 10 of the present invention permits the game table fabric 10 to be applied directly to the game table bed 32 without the use of additional glues or adhesives over a substantial amount of the game table bed 32. These glues and adhesives act as contaminates with respect to the game table bed 32 and cause excessive and quicker wear of the game table fabric 10.

The game table fabric 10 of the present invention comprises a felt-like material. In an alternative embodiment, the fabric 10 comprises a wool fiber blend or any other fabric that is suitable fabric. In another embodiment, the game table fabric 10 may comprise suitable synthetic materials. A nonpermanent releasable adhesive 16 is disposed on the back side 20 of the game table fabric 10 and the front side 19 comprises the playing surface in which the billiard ball or other game devices (dice, chips, etc.) come in contact with during game play. Woolen fabrics provide an attractive and functional playing surface because of their ability to be easily dyed and decorated and importantly the fabrics allow a rapid and true (non-veering) "carry" (roll) of the ball.

In accordance with the present invention, the nonpermanent releasable adhesive 16 layer is designed to allow the game table fabric 10 to adhere to the game table bed 32 or other appropriate play supporting surface for an extended time period while allowing the game table fabric 10 to be releasable, i.e., removed cleanly without the use of stripping aids. The nonpermanent releasable adhesive 16 also permits the game table fabric 10 to be repositionable during the installation or resurfacing of the game table fabric 10.

A wide variety of materials may be employed as nonpermanent releasable adhesive 16 as described, for example, in U.S. Pat. Nos. 3,922,464, 4,598,112, and 4,166,152, the disclosures of which are incorporated herein by reference in their entirety. A preferred adhesive 16 is an elastomeric-type nonpermanent releasable adhesive. Elastomeric-type nonpermanent releasable adhesives are known to those skilled in the art and include but are not limited to the following: natural rubber, reclaimed rubber, styrene-isoprene-styrene rubber, butadiene-acrylonitrile rubber, polyvinyl ether rubber, styrene-butadiene-styrene rubber, butyl rubber, polyisobutylene rubber, nitrile rubber, styrene-butadiene rubber, polyurethane, polysulfide, polyesters, silicone resins and gums, neoprene rubber, acrylic, methacrylic, polyacrylate ester rubber, and vinyl and mixtures thereof. Acrylate based adhesives may also used as the nonpermanent releasable adhesive 16. A particularly preferred nonpermanent releasable adhesive 16 comprises a blend of elastomeric and hydrophobic elastomers and is commercially available from Mid West Coating of Lake Bluff, Ill. under the trade designation MW815.

The nonpermanent releasable adhesive 16 layer disposed on the back side 20 of the game table fabric 10 releasably adheres the woolen fabric 10 to the game table bed 32. Said adhesive layer 16 may be formed by any known and suitable technique. For example, the adhesive 16 may be deposited on the back side 20 of the game table fabric 10 and applied via a knife over roll transfer coating method or it may be sprayed on.

A release cover 14 is applied to the nonpermanent releasable adhesive 16 layer. The release cover 14 is releasably adhered to the layer of nonpermanent releasable adhesive 16 and protects and maintains the tackiness of the adhesive layer 16 before the application of the game table fabric 10 to the game table bed 32. The release cover 14 preferably comprises silicone-release paper but may comprise any suitable release cover known in the art.

In accordance with the present invention, a method of manufacturing the game table fabric 10 is provided. During manufacture of the game table fabric 10, a nonpermanent releasable adhesive 16 is disposed directly on the back side 20 of the game table fabric 10 and then dried and cured. The nonpermanent releasable adhesive layer 16 may be applied by any number of suitable coating techniques that are known in the art, such as knife blade, reverse roll spraying or by printing machines. After the nonpermanent releasable adhesive 16 is coated onto the back side 20 of the game table fabric 10, a release cover, preferably a silicone treated release paper, is applied by pressure to protect the slightly viscous adhesive deposit on the back side of the game table fabric. This is generally done in tandem on the same piece of equipment as the application of the adhesive 16 itself; however, the application of the release cover 14 may be done separately from the application of the nonpermanent releasable adhesive 16.

The game table fabric 10 may then be rolled by rolling means known in the art for convenient storage until ready for use by the installer. The protective release cover 14 is easily peeled off, as required, by the installer at the point of installation of the game table fabric 10 or the recovering of an existing game table fabric 10.

With reference to FIG. 1, the game table fabric 10 of the present invention is illustrated. Game table fabric 10 includes woolen fabric 18, nonpermanent releasable adhesive 16 and release cover 14, wherein the nonpermanent releasable adhesive 16 is disposed on the back side 20 of the woolen fabric 18 and a release cover 14 is layered onto the nonpermanent releasable adhesive layer 16 to form game table fabric 10. For convenience, the game table fabric 10 is wound into roll form 12 with the release cover 14 faces upwardly therefrom.

In a preferred embodiment illustrated in FIG. 2, the nonpermanent releasable adhesive layer 16 is applied directly to one side of the release cover 14. This application may be accomplished by common coating techniques. In this embodiment during processing, the release cover has a front 15 and a back side 17 and is fed into the coating apparatus so that the back side 17 faces upwardly and the release cover 14 is fed under pressure from a conventional feed roll 24 to a station where the nonpermanent releasable adhesive 16 is disposed on the back side 17 of the release cover 14 using conventional coating techniques. Optionally, to regulate the amount of nonpermanent releasable adhesive applied, the release cover 14 traverses under a doctor blade 26 conventional in the industry which is adjusted to scrape the nonpermanent releasable adhesive 16 to as evenly apply the nonpermanent releasable adhesive layer 16 onto the back side 17 of release cover 14. After disposing the nonpermanent releasable adhesive 16 onto the back side 17 of the release cover 14 the release cover 14 is transported to a conventional heater 29 wherein the adhesive 16 is dried and cured. The woolen fabric 18 is fed under tension from a conventional feed roll 22 so that the back side 20 of the woolen fabric 18 faces downward and the back side 20 of the woolen fabric 18 is applied to the nonpermanent adhesive layer 16 by a pressure roller (knip roller) 28 under a pressure of approximately 100 psi. Pressure roller 28 rolls the woolen fabric together 18 with the nonpermanent releasable adhesive 16 disposed on the release cover 14 to form the game table fabric 10 of the present invention. Once the woolen fabric 18 is applied, the game table fabric 10 is wound into roll form where the release cover 14 faces outwardly therefrom. The nonpermanent releasable adhesive 16 is applied in a predetermined amount so as to provide an acceptable level of intended tackiness and cohesiveness needed for releasable adhering the game table fabric 10 to the game table bed (not shown).

In an alternative embodiment of the present invention and referring now more particularly to FIG. 3, a processing stage in the manufacture of the game table fabric 10 is shown, wherein the nonpermanent releasable adhesive layer 16 and the release cover 14 are disposed onto a woolen fabric 18. The woolen fabric 18 arrives from initial processing (not shown) wherein the woolen fabric 18 has a front side 19 and a back side 20. During the initial processing, the woolen fabric 18 is wound into roll form 22 with the front side 19 facing outwardly therefrom.

During processing, the roll 22 is unwound so that the back side 20 faces upwardly and the nonpermanent releasable adhesive 16 is disposed on the back side 20 using common coating techniques known in the art. Such common coating techniques include but are not limited to knife blade, reverse roll or printing machines. In one embodiment, to regulate the amount of adhesive applied, the game table fabric traverses under a doctor blade 26 conventional in the industry which is adjusted to scrape the nonpermanent releasable adhesive 16 so as to evenly apply the nonpermanent releasable adhesive layer 16 onto the back side 20 of the woolen fabric. The nonpermanent releasable adhesive 16 is then dried and cured by conventional methods, such as by use of an oven and drying apparatus 29.

Once the nonpermanent releasable adhesive 16 has dried, the release cover 14 is permanently anchored to the woolen fabric 18 by a pressure application of the release cover 14 to the nonpermanent releasable adhesive layer 16. The release cover 14 may be applied to the nonpermanent releasable adhesive layer by conventional techniques. For example as shown in FIG. 3, the release cover 14 may be fed under tension from a conventional feed roll 24 and applied to the back side 20 by a pressure roller (knip roller) 28. After the release cover 14 has been applied to the nonpermanent releasable adhesive layer 16 which is disposed on the back side 20 of the woolen fabric 18, the two may be knip rolled together.

Figure 4:
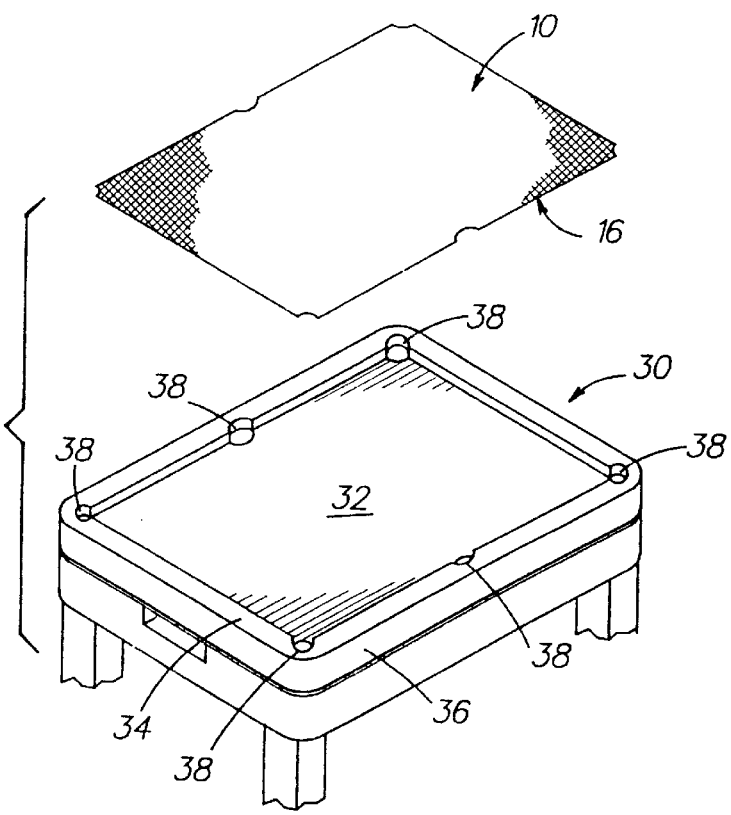
FIG. 4 is a fragmentary perspective view of the game table bed to be resurfaced or to which a game table fabric is to be initially installed thereon.

In accordance with the present invention, a method of installing or recovering a game table fabric 10 is also provided. The method of installing or resurfacing of a game table fabric 10 is illustrated in the accompanying drawings. In FIG. 4, a game table 30 is shown. The table 30 includes a game table bed 32 comprising a slate bed surrounded by a cushion 34 formed of rubber or the like. Cushion 34, in turn, is surrounded by a rail 36 which forms the border of table 30. Table 30 may include pockets 38 to enable pocket billiards ("pool") or other similar games to be played or it may be provided without pockets. In either event, the game table bed 32 is covered by a sheet of game table fabric 10.

After the game table slate bed 32 has been properly cleaned and prepared for the application of a new game table fabric 10, the installer simply spreads the game table fabric 10 of the present invention over the entire surface of the game table bed 32 and cuts the material to the specific dimension of the game table bed 32. The installer then peels back about a foot to about eighteen (18) inches of the release cover (not shown) thereby exposing the nonpermanent releasable adhesive 16 of this exposed area. The installer then applies the nonpermanent releasable adhesive surface 16 of the game table fabric 10 to the game table bed 32 and then pulls the release cover from the adhesive surface 16 the entire length of the game table bed 32 thereby attaching the nonpermanent releasable adhesive surface 16 to the game table bed 32. After smoothing the game table fabric 10 out over the entire game table bed 32, the game table fabric 10 is trimmed along the entire edge of the game table bed 32 by conventional cutting means. The installer uses a small amount of contact glue at the pockets 38 of the table to assure contouring of the game table fabric 10 at the pocket openings 38. The installation of the game table fabric 10 on a conventional game table using the game table fabric 10 of the present invention is accomplished in ⅓ (33%) less time in relation to the traditional installation time using traditional fabrics. The installer, if necessary, can reposition the material up to six (6) times before there is any reduction in the original tack of the nonpermanent releasable adhesive 16 used in accordance with the present invention.

If necessary, the game table fabric 10 surrounding the cushion may be replaced in a similar manner to that described. As shown in FIGS. 5 and 6, a conventional game table 70 having cushion 34 with a game table fabric surface 10 is shown. The conventional game table 70 has a cushion 34 coupled to a rail 36 and a table frame 38 which is coupled to the rail 36 and the game table bed 32. Typically, the cushion 34 is composed of a rubber material but it may be composed of any other suitable materials that are known in the art. As shown in FIG. 5, after the game table bed 32 has been surfaced with the game table fabric 10 of the present invention, the cushion 34 having game table fabric 10 disposed thereon may be assembled with the rail 36, the game table bed 32 and the table frame 38 to form a conventional game table 70. FIG. 6 illustrates the assembled cushion 34. To install or resurface cushion 34, the existing fabric (not shown) is removed from cushion 34. Game table fabric 10 has a top end 50 and a bottom end 52. The game table fabric 10 is positioned so that the top end 50 is disposed on a portion of the back side 54 of rail 36, the front side 56 of rail 36 being coupled with cushion 34. Generally, top end 50 is further secured to rail 36 by applying a small amount of contact glue, staples or other securing means known in the art. The game table fabric 10 is then stretched and cleanly smoothed over the surface of the rail 36 and the cushion 34 before securing the bottom end 52 of the fabric 10 to the backside 54 of rail 36. Bottom end 52 may be further secured to the backside 54 of rail 36 by using a small amount of contact glue or staples. After cushion 34 and rail 36 have been surfaced with the game table fabric 10, the rail 36 and cushion are positioned on fabric 10 which is disposed on the game table bed 32. After properly aligning the backside 54 of rail 36 with one edge of bed 32, the rail 36 is secured to the table frame 38 by securing means 60 known in the art, such as screws, etc. When the rail 36 secured to the table frame 38, there is slight vertical pressing at the location where rail 36 overlaps bed 32 which keeps and protects the bond between the game table fabric 10 and the game table bed 32 from wear and tear during play.

In game tables 70 having a groove (not shown) in the top portion 62 of the rail 36, the cushion 34 is surfaced by positioning game table fabric 10 along the groove and then lightly applying pressure to lay the game table fabric 10 into the groove. After the game table fabric 10 has been positioned in the groove, the cushion 34 is further surfaced with game table fabric 10 as disclosed hereinbefore.

The advantages of the game table fabric 10 of the present invention are realized during installation of the game table fabric 10 on a new game table as well as during the recovering of a game table. The initial installation or the recovering of the game table fabric 10 becomes a much simpler task and quicker task to complete. The entire game table fabric 10 may be positioned, tightened or smoothed out over the entire game table bed 32 before any mechanical attachment is even necessary.

Importantly, the present invention substantially alleviates or eliminates the transfer of chalk dust to the slate bed 32 during the recovering process for replacing or repairing the playing surface. Because no additional glues or adhesives are used in accordance with the present invention, the particular difficulty associated with the removal of chalk dust in areas where spot gluing was required is eliminated. Thus, the present invention overcomes the deficiency in the prior art in which any small grains of residual dust would act as abrasion sites against the backside 20 of the replacement game table fabric 10 and substantially accelerates the wear of the game table fabric 10.

While, it is anticipated that the replacement game table fabrics 10 will be provided prec-cut for standard size tables (i.e., 4 feet/8 feet, 4.5 feet/9 feet, etc.), if necessary however, the game table fabric 10 may be cut as necessary to accommodate any variation in the table size. This is a relatively simple task requiring no special skills. Similarly, it is expected that pre-cut replacement game table fabrics 10 for the cushion 34 will be provided, however, as with the game table fabric 10 replacement, modifications may easily be made in such fabrics if necessary.

While the game table fabric 10 of the present invention is particularly adapted to be used to provide the playing surface for playing ball games such as Snooker, Billiards, and Pool; it is within the scope of this invention that the game table fabric 10 may be used as the surface for table games which are typically found in casinos, such as card gaming tables (e.g. Blackjack, etc.) and dice gaming tables (e.g. Roulette, Craps, etc.). These game table fabrics 10 also suffer from continuous wear as the result of the continuous usage by casino visitors and players at such tables. The need to be able to easily and quickly surface and resurface such game tables is especially compounded by the fact that often game table players use tobacco products and consume liquid beverages while playing at such tables. These actions increase the likelihood of that the game table fabric 10 will become soiled and need replacement.

While preferred embodiments have been shown and described, various modifications and substitutions may be made thereto without departing from the spirit and scope of the invention. Accordingly, it is understood that the present invention has been described by way of illustrations and not limitation.

What is claimed is:

1. A game table fabric, comprising:
    a woolen fabric having a front side and a back side, the front side being a playing surface suitable for ball movement thereacross;
    a nonpermanent releasable adhesive layer disposed on the back side of the woolen fabric, the nonpermanent releasable adhesive layer having a sufficient tack so that the back side of the woolen fabric may be releasably adhered to a playing table, the nonpermanent releasable adhesive layer being disposed substantially over the entire back side of the woolen fabric, wherein the woolen fabric has a size substantially corresponding to a game table bed; and
    a release cover disposed on the nonpermanent releasable adhesive layer.

2. The game table fabric as set forth in claim 1, wherein the nonpermanent releasable adhesive comprises:
    a low tack elastomeric adhesive.

3. The game table fabric as set forth in claim 1, wherein the release cover comprises a silicone-release paper releasably adhered to the nonpermanent releasable adhesive.

4. The game table fabric as set forth in claim 1, wherein the game table bed is selected from the group consisting of a snooker table, billiard table, pool table, card table, and dice table.

* * * * *